Feb. 16, 1926. 1,573,541
J. DEMAND
RECIPROCATING MECHANISM FOR WINDSHIELD CLEANERS AND THE LIKE
Filed Feb. 23, 1921  2 Sheets-Sheet 1
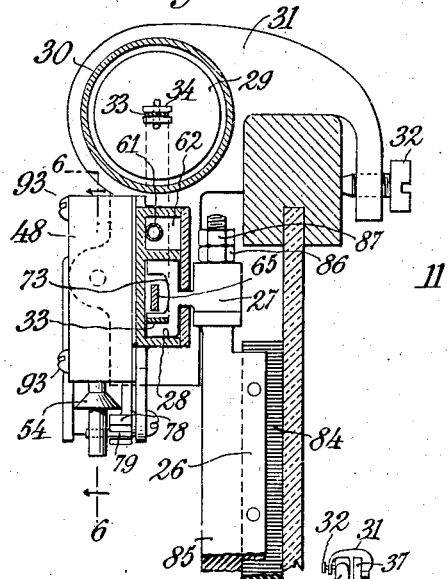
Inventor
Joseph Demand,
By Attorneys,
Fraser, Turk & Myers.

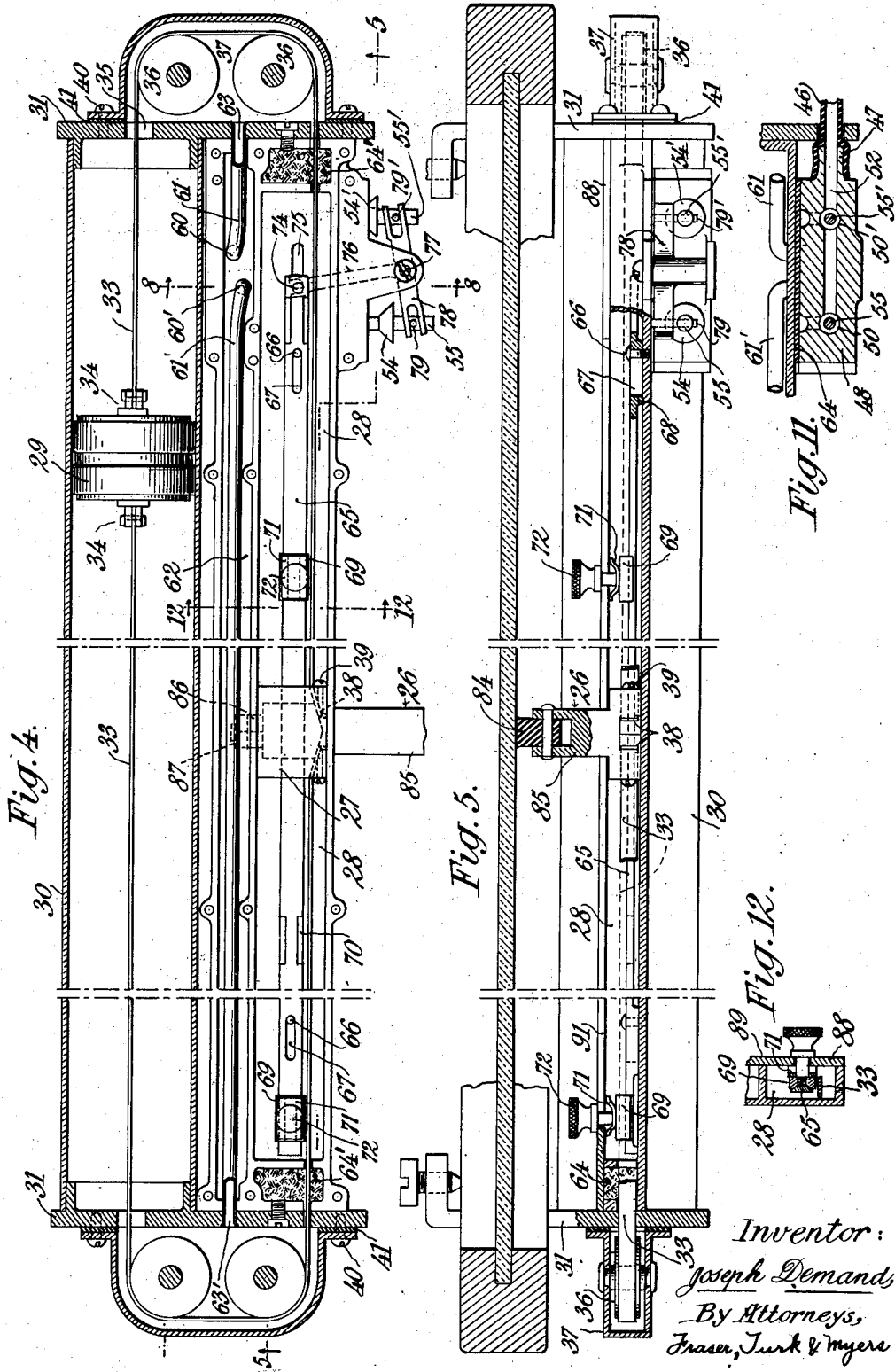

Patented Feb. 16, 1926.

1,573,541

UNITED STATES PATENT OFFICE.

JOSEPH DEMAND, OF NEW YORK, N. Y., ASSIGNOR, BY MESNE ASSIGNMENTS, TO ALL CLEAR WINDSHIELDS, INC., OF BOSTON, MASSACHUSETTS, A CORPORATION OF MASSACHUSETTS.

RECIPROCATING MECHANISM FOR WINDSHIELD CLEANERS AND THE LIKE.

Application filed February 23, 1921. Serial No. 447,070.

*To all whom it may concern:*

Be it known that I, JOSEPH DEMAND, a citizen of the United States of America, residing in the borough of the Bronx, city and State of New York, have invented certain new and useful Improvements in Reciprocating Mechanism for Windshield Cleaners and the like, of which the following is a specification.

This invention relates to reciprocating mechanism for windshield cleaners and other devices to which it is desired to impart a reciprocating motion and is particularly adapted for use on motor vehicles. It is in the nature of an improvement upon my prior invention disclosed in U. S. Patent No. 1,370,684, reissued April 11, 1922, No. 15,331.

The invention herein disclosed differs from that of my above-mentioned prior application, in that the guideway for the wiper carrier, the cylinder for the driving piston, the movement transmitting mechanism, valves and valve shifting mechanism, are all united in a compact self-contained structure with the guideway and cylinder in close side-by-side relation, so that the device may be readily applied as a unit to a windshield irrespective of its size.

The present invention also provides means whereby, in extremely stormy weather, the length of stroke of the wiper may be limited, so that a relatively small area of the windshield, immediately in front of the driver's position, may be kept thoroughly clear of snow, moisture, or other means of obstructing vision. By thus limiting the length of stroke of the wiper it is enabled to traverse the area to be cleaned more frequently, thereby preventing any material accumulation of frost or moisture between successive strokes. In less severe weather, the stroke of the wiper may be increased, thereby affording a relatively larger area of clear windshield surface.

My present invention also differs from that disclosed in my aforesaid prior application, in that the valves which control the fluid operated motor for the wiper are all assembled in a single valve chest and are further provided with a single operating mechanism which is of the quick throw or snap switch type. By using such mechanism as a means for controlling the valves, there is always a tendency on the part of the valve operating mechanism to throw the valves to their limit of movement in one direction or the other, thus preventing the mechanism from coming to rest with all valves open, in which case the mechanism would remain dead, since there would be no tendency for the motor to drive the windshield in either direction.

Although a piston and cylinder have been herein illustrated as the means for driving the wiper, certain features of the invention are in no manner limited to that particular form of driving means but might be used in connection with a reversible fluid operated motor of any appropriate type.

In the drawings illustrating the preferred form of the invention,—

Figure 1 is a view of part of an automobile body and hood, showing in end view a windshield with the improved windshield cleaner applied thereto.

Fig. 2 is a front view of the windshield and applied windshield cleaner.

Fig. 3 is a view in section on a large scale, taken on the line 3—3 of Fig. 2, looking in the direction of the arrows.

Fig. 4 is a view of the cleaner as seen from the rear, certain parts being indicated in section and the cover plates of the carrier guideway and pipe duct being omitted.

Fig. 5 is a view of the cleaner as seen from below, certain parts being indicated as broken away and others indicated in section.

Fig. 6 is a view in section through the line 6—6 of Fig. 3, looking in the direction of the arrows.

Fig. 7 is a rear face view of the valve chest.

Fig. 8 is a view in section along the line 8—8 of Fig. 4, looking in the direction of the arrows.

Fig. 9 is a view in section along the line 9—9 of Fig. 7, looking in the direction of the arrows, the valves being omitted.

Fig. 10 is a rear face view of a portion of the windshield cleaner, illustrating the cover plates for the guideway and pipe duct in place.

Fig. 11 is a view in section along the line 11—11 of Fig. 6, looking in the direction of the arrows.

Fig. 12 is a section along the line 12—12 of Fig. 4, looking in the direction of the arrows.

Referring first to Figs. 1 and 2, the windshield cleaner is illustrated as applied to a windshield comprising upper and lower sashes 20, 21 pivoted at 22, 23 to stanchions 24 mounted in an automobile body 25.

The cleaner, as herein disclosed, comprises a vertical wiper 26 extending downwardly from a carrier 27 mounted for reciprocation in a channel-shaped guideway 28 and connected for movement with a piston 29 (Fig. 4), mounted for reciprocation within a cylinder 30 (Figs. 2 and 4). The guideway 28 and cylinder 30 are mounted in close side-by-side relation and supported by brackets 31, which may be detachably secured to the upper sash of the windshield by means of clamping screws or other appropriate fastening devices 32.

Although herein disclosed as applied to the upper sash of a two-sash windshield, it will be apparent that the invention might be applied to both sashes of the windshield or to windshields of types other than that herein disclosed, by suitably modifying the means of attachment.

The piston 29 (Fig. 4) may be connected with the wiper carrier 27 by means of flexible bands 33 each connected at one end with said piston by a suitable fastening device 34 and extending thence through an opening 35 in the end of the cylinder, to and about pulleys 36 mounted in one of a pair of pulley boxes 37, thence through the guideway 28 to one side of the carrier 27. One end of each band 33 may be adjustably secured to the carrier 27 by being introduced between the walls of a slot 38 and held in place by a set screw or other fastening device 39.

The pulley boxes 37 are secured to the end brackets 31 by screws 40 or other suitable fastening devices, gaskets 41 being inserted between the bases of the pulley boxes and said brackets to render the pulley boxes air tight, for reasons which will subsequently appear.

The piston may be reciprocated in the cylinder by any appropriate medium, as for example, by introducing air under pressure to one end of the cylinder, or by reducing the pressure in the other end.

As herein disclosed, advantage is taken of the partial vacuum which is maintained in the intake manifold 42 (Fig. 1) of the motor. To this end a pipe of small diameter 43 is tapped at one end into the intake manifold and from thence leads to a point of the automobile body near one end of the windshield. This pipe 43 may be controlled by a valve 44 having a hand wheel 45 located at a convenient point for operation by the driver. From this point the connection with the windshield cleaner may be completed by means of rubber tubing 46 (Figs. 1 and 2), which may be carried up along the stanchion of the windshield cleaner to a nipple 47 on a valve chest 48 (Figs. 2, 3, 6 and 7), from which interchangeable connections may be established with the opposite ends of the cylinder 30, by means hereinafter described.

The valve chest 48 may be secured to the face of the guide or channel 28 at a point near one end of the cleaner, as indicated in Fig. 2. This valve chest and the enclosed valves and operating mechanism comprise means for controlling connections between the ends of the cylinder 30 and points of different fluid pressure, and include means for reversing said pressure so as to alternately change the resultant pressure on the piston, and thereby cause it to intermittently move in opposite directions.

In the specific embodiment herein disclosed, whenever the valve 44 is opened, one end of the cylinder is connected by the valves in the valve chest 48 with the intake manifold 42, and the other end is connected with the atmosphere.

More specifically stated, the valve chest may comprise two sets of valve chambers 49, 50, 51, and 49' 50', 51'. A common entrance port 52 leads from the nipple 47 to and connects with the chambers 50 and 50'. Valve disks 53, 54 and 53', 54' are connected in pairs by valve stems 55, 55'.

By mechanism hereinafter to be described, these valves are always so positioned that the valve disk 54 is separated from its seat when the valve disk 53 is seated, and vice versa. The valve disk 53' is likewise separated from its seat when the valve disk 54' is seated. Moreover, the controlling mechanism for these valves is such that the valve 53 is always closed when the valve 53' is opened, and valve 54' closed when the valve 54 is opened.

The chambers 49, 49', when their corresponding valve disks are removed from their seats, are opened to atmospheric pressure, whereas the chambers 50, 50' are connected by means of the port 52, tubing 46, etc., with the intake manifold of the motor, as hereinbefore described, so as to be materially below atmospheric pressure.

The chambers 51, 51', above their valve seats, have openings 56 and 56' (Fig. 7) extending into grooves 57 and 57', in the face of the valve chest, and said grooves are connected by openings 58, 58' with the chambers 49, 49', respectively.

Leading from the grooves 57, 57' are branch grooves 59, 59' terminating under the ends 60, 60' (Fig. 4) of pipes 61, 61' which extend in opposite directions through a pipe duct or channel 62 and terminate in openings 63, 63' leading into the pulley boxes 37.

The pipes 61 and 61' may be made of brass or other appropriate material having their ends brazed or otherwise secured to the openings in the brackets 31 and in the base of the pipe channel, respectively.

The valve chest may be secured to the face of the carrier guideway and pipe channel in any appropriate manner, a gasket 64 (Fig. 11) having slots therein conforming with the grooves or channels 57, 57', 59 and 59' being inserted between the valve chest and the surface to which it is secured, to render the conduits formed by said grooves, fluid tight.

With the valves in the positions indicated in Figs. 6 and 7, atmospheric pressure is admitted to chamber 49, thence passes through opening 58, groove 57, branch 59, pipe 61 (Fig. 4), pulley box 37, opening 35, to the right end of the cylinder. At the same time the suction of the manifold is communicated by means of pipe 43, tubing 46, port 52, chamber 50', opening 56', groove 59', pipe 61' (Fig. 4), and the left end pulley box to the left end of the cylinder.

With the valves in the positions indicated, therefore, the pressure on the right side of the piston will be greater than the pressure on the left side, and the piston will be caused to move to the left. This motion will be transmitted by means of the bands 33 to the wiper carrier which will be moved to the right.

By means hereinafter to be described, however, the valves illustrated in Figs. 6 and 7, will subsequently be moved to their alternate positions, in which chamber 49' will be opened to atmospheric pressure, and the suction from the manifold will be communicated from chamber 50 to chamber 51. The atmospheric pressure and suction of the manifold will thus be communicated by connections which may be readily traced with the opposite ends of the piston, whereby it will be caused to move in the opposite direction and thus reverse the direction of movement of the carrier.

It will be observed, that with the valves in the positions indicated in Figs. 6 and 7, the manifold suction within the chamber 50 will have a tendency to hold the valve disk 53 against its seat. This tendency will be augmented by the atmospheric pressure which will at the same time be admitted to the opposite side of said valve disk from the chamber 49 through opening 58, groove 57 and opening 56 to chamber 51. It will also be observed that the valve disk 54' will be held against its seat by atmospheric pressure, the suction of the manifold being effective at the same time upon the opposite face of the valve to which it is communicated from the port 52 by way of the chamber 50', chamber 51', opening 56', groove 57', opening 58' to chamber 49'. For this reason, the difference of pressure of the fluid controlled by the valves will always have a tendency to hold them in either position to which they have been moved.

To prevent leakage at the point where the bands 33 enter the guideway 28, there are provided chambers 64' forming stuffing boxes in the ends of said guideway, said stuffing boxes being filled with absorbent material, such as cotton, saturated with oil, or any other suitable material.

The operating mechanism for the valves comprises a shifter bar 65 slidably mounted in the bottom of the guideway by means of pins 66 passing through slots 67, the shifter bar having lugs 68 (Fig. 5) projecting from its under surface to reduce the friction between the shifter bar and floor of the guideway.

The shifter bar is provided with adjustable stops 69 normally held in engaging relation with notches 70 in the shifter bar by means of springs 71. A suitable thumb piece 72 is riveted or otherwise secured to each of the stops 69, whereby it may be raised against the effort of its spring 71 and shifted to a position for engagement with any desired pair of notches 70 in the shifter bar.

The wiper carrier 27 is provided with a channel 73 (Fig. 3) in its under surface, so as to span the shifter bar and ride clear of the heads of the pins 66. The stops 69 will also freely move over the heads of the pins 66, when lifted out of the notches 70, for the purpose of adjusting the same.

The shifter bar 65 is provided at its right end (Fig. 4) with a pin 74 projecting through a slot 75 in the floor of the guideway and engaging a slot in an arm 76 (Fig. 4) secured to a rock shaft 77, which is in turn fast to a rock bar 78 having pin-and-slot connections 79, 79' with the ends of the valve stems 55, 55'.

The rock shaft 77 may be supported in bearing members 77', 77'' (Fig. 8), one extending from the guideway 28 and the other extending from and forming part of the valve chest 48.

With the valves in the positions indicated in Fig. 6, the piston 29 will be moved to the left and the wiper carrier and wiper to the right, as already explained, until the wiper carrier engages the right-hand stop 69, after which the shifter bar will be moved with the carrier, thereby turning the rock shaft 77 and its connected arm 78 and causing the positions of the valves to be reversed. This will result in a reversal of the resultant pressure upon the piston which will be caused to move to the right, and which, in turn, will cause the wiper carrier to be moved to the left until it is brought into engagement with the left-hand stop 69, thereby again reversing the valves so as to cause the piston to again move towards the left.

In order that there may be no possibility of the piston and wiper carrier coming to rest with all of the valves open, mechanism is provided whereby, on movement of the arm 76 slightly beyond its midway position, it will be automatically and positively carried to the limit of its movement, thereby suddenly reversing the positions of the valves. This mechanism, as illustrated in Figs. 6, 7 and 8, comprises an expansible strut 80 having one end engaged in a notch 81 in a recessed portion of the valve chest, and the other end engaged in a notch 82 in a short arm of the rock bar 78. The expansible strut 80 comprises telescoping parts constantly urged in opposite directions by a spring 83, whereby, on movement of the rock bar slightly more than half way in either direction, the strut is caused to pass through a dead center relation with respect to the short arm of said rock bar and cause the same to be carried to the limit of its movement in the same direction.

The slots of the pin and slot connections between the shifter bar 65 and arm 76, and between the rock bar 78 and valve stems 79, 79', are larger than the pins, so as to provide sufficient lost motion to permit the spring 83 to be cocked by movement of the arm 76 during the first part of its stroke before the valves begin to move, and to permit the arm to complete its stroke and suddenly reverse the valves ahead of the final movement of the shifter bar.

The windshield wiper 26 may comprise a strip 84 of rubber or other suitable material mounted in a channel-shaped holder 85 (Figs. 3, 4 and 5), which may be secured by means of a nut 86 and lock nut 87 to the wiper carrier.

The channel-shaped guideway and adjoining pipe channel may be closed by means of cover plates 88, 89, (Fig. 10) secured by means of screws 90 or other appropriate fastening means, to lugs or bosses projecting from the walls of the guideway and pipe channel.

As illustrated in Fig. 10, the cover plates are of such form as to completely cover the stuffing boxes 64 at the ends of the guideway, at the same time leaving a slot 91 to provide for free endwise movement of the wiper carrier 27 and stops 69.

In assembling the device, the bands 33 may first be secured to the wiper carrier, and the carrier and stops placed in their proper positions with respect to the guideway and shifter bar, after which the plates 88 and 89 may be moved into engagement with the notches in the sides of the carrier and stops from opposite directions and screwed into place.

As a simple means of constructing the valve chest it may be die-cast from suitable soft metal, the sets of valve chambers 49, 50, 51 and 49', 50', 51', being cored completely through the same, and the ends subsequently closed by plugs 92, as indicated in Fig. 6. The making of the fluid conduits 57, 57' and 59, 59', in the form of grooves in the surface of the valve chest, also facilitates this simple method of construction. The valve chest may be secured to the face of the channel guideway by means of screws 93 (Fig. 3), or other suitable fastening devices.

Ordinarily, the stops 69 may be engaged with the end pairs of notches 70 in the shifter bar, in which case the wiper will be carried from end to end of the guideway and keep substantially the whole length of the windshield free from frost or moisture. In extremely stormy weather, however, moisture and snow or frost might accumulate so rapidly as to interfere with clear vision between the strokes of the wiper if required to traverse the whole length of the windshield. Under such circumstances the stops 69 may be moved inwardly from the ends of the windshield to points bounding a relatively narrower portion immediately in front of the driver's position. When so positioned, the strokes of the wiper are shortened, whereby the same surface will be wiped more frequently, thereby preventing any accumulation of frost, snow or the like, between strokes. The velocity of movement of the wiper may also be regulated by means of the throttle valve 45.

It is believed that the operation of the mechanism as a whole will be clear, in view of the foregoing description which has been given in connecton with that of the construction of the same.

Although the preferred form of the invention has been herein illustrated and described, it is understood that various changes and modifications may be made within the scope of the invention as defined by the appended claims.

What I claim is:—

1. A reciprocating mechanism for a windshield cleaner, comprising a cylinder, a piston, and means including valved connections for moving said piston in opposite directions in said cylinder, a guideway extending along said cylinder in adjacent parallel relation therewith, a wiper carrier movable along said guideway, movement transmitting means connecting said carrier with said piston whereby on movement of said piston a movement of translation will be imparted to said carrier, and valve operating mechanism engageable by the movable part of said mechanism at a predetermined point in the movement of said carrier in either directon whereby the motor connections may be reversed, thereby effecting a reversal of the direction of movement of said piston and carrier, all parts of said mechanism being at all times confined within a space which exceeds the length of said cylinder by but a relatively small fraction of its length.

2. A reciprocating mechanism for a windshield cleaner, comprising a cylinder, a piston, and means including valved connections for moving said piston in opposite directions in said cylinder, a guideway, a wiper carrier movable along said guideway, movement transmitting means connecting said carrier with said piston whereby on movement of said piston a movement of translation will be imparted to said carrier, and valve operating mechanism including a shifter bar lying along the guideway, said bar having stops extending into the path of movement of said carrier to be engaged thereby at opposite ends of its stroke, whereby said bar will be shifted and the motor connections reversed.

3. A reciprocating mechanism as defined by claim 2 further characterized in having the stops on the shifter bar settable at different positions therealong whereby the extent of movement of said carrier in either direction may be varied at will.

4. A reciprocating mechanism as defined by claim 1 further characterized in that the movement transmitting means comprises flexible connectors extending from said piston in opposite directions, thence about guides at the ends of said cylinder and guideway, and thence along said guideway to said carrier.

5. A reciprocating mechanism for a windshield cleaner comprising, in combination, a traveling wiper carrier, a guideway therefor, and means for reciprocating said carrier along said guideway, said reciprocating means comprising a cylinder, a piston therein, movement transmitting means connecting said carrier with said piston, valved connections from the ends of said cylinder to sources of fluid supply of different pressure, the valves of said connections being shiftable to different positions whereby said connections may be interchanged, and means operated by said carrier at a predetermined point in its movement in either direction for shifting said valves, thereby reversing the resultant pressure on said piston and causing it to move in the opposite direction, the cylinder, carrier guideway, movement transmitting mechanism, valves and valve shifting mechanism being united in a compact, self contained structure with the guideway and cylinder in close side-by-side arrangement and provided with means for applying the device as a unit to a windshield.

6. A device of the character defined by claim 5, in which the movement transmitting means connecting the piston with the carrier comprises fluid tight pulley boxes supported at the ends of said cylinder and guideway, pulleys mounted in said boxes, and flexible bands carried from opposite ends of said piston, to and about said pulleys and thence, through said guideway, to opposite sides of said carrier, said guideway having stuffing boxes at each end thereof to prevent fluid leakage at the points where said bands enter from said pulley boxes.

7. A device of the character defined by claim 5, having the valves grouped together in a single valve block attached to the carrier guideway and in which the valve shifting means comprises valve operating mechanism mounted in said valve block, and a connected shifter bar in said guideway extending along the path of movement of said carrier and having stops to be engaged thereby at predetermined points in its path of movement.

8. A reciprocating mechanism for a wind shield cleaner, comprising a cylinder, a piston, and means including valved connections for moving said piston in opposite directions from one end of said cylinder to the other, a guideway extending along said cylinder in adjacent parallel relation and approximately commensurate therewith in length, a wiper carrier movable along said guideway, movement transmitting means connecting said carrier with said piston whereby on movement of said piston from one end of said cylinder to the other a movement of translation will be imparted to said carrier from one of its ends to the other, and valve operating mechanism engageable by said carrier at the end of its movement in either direction whereby the motor connections may be reversed, thereby effecting a reversal of the direction of movement of said piston and carrier, all parts of said mechanism being at all times confined within a space which exceeds the length of said cylinder by but a relatively small fraction of its length.

9. The combination of claim 8 further characterized in that the various specified parts of the cleaner reciprocating mechanims are united in a compact self contained structure adapted to be confined to a narrow space along one edge of the wind shield and provided with means for applying the device as a unit thereto.

In witness whereof, I have hereunto signed my name.

JOSEPH DEMAND.